United States Patent [19]

Shwartzman

[11] 4,099,417
[45] Jul. 11, 1978

[54] METHOD AND APPARATUS FOR DETECTING ULTRASONIC ENERGY

[75] Inventor: Stanley Shwartzman, Somerville, N.J.

[73] Assignee: RCA Corporation, New York, N.Y.

[21] Appl. No.: 800,277

[22] Filed: May 25, 1977

[51] Int. Cl.² .............................................. G01H 3/10
[52] U.S. Cl. ........................................ 73/606; 73/646
[58] Field of Search ............ 73/556, 557, 558, 67.5 R, 73/67.6 R, 606, 646; 134/1, 113, 184

[56] References Cited
U.S. PATENT DOCUMENTS

| | | | |
|---|---|---|---|
| 2,832,214 | 4/1968 | Trommler | 73/67.6 |
| 3,137,837 | 6/1964 | Wreford | 73/67.6 |
| 3,469,451 | 9/1969 | Eizenberg | 73/371 |
| 3,572,088 | 3/1971 | Gericke et al. | 73/67.6 |
| 3,893,869 | 7/1975 | Mayer et al. | 134/184 X |
| 3,915,004 | 10/1975 | Nollen et al. | 73/371 |

Primary Examiner—Herbert Goldstein
Attorney, Agent, or Firm—H. Christoffersen; T. H. Magee

[57] ABSTRACT

An apparatus for detecting ultrasonic energy comprises a chamber, partially filled with a colored liquid, having two sides separated by spacing no greater than about 25 millimeters and having a transparent section allowing for visual observation of the height of the liquid therein. A method of detecting the energy level of a beam of ultrasonic energy being propagated through a fluid comprises positioning the apparatus in the fluid so that the beam of energy strikes the liquid at the surface thereof, whereby the beam generates a visible arc-shaped spray having an amplitude proportional to the energy level of the beam.

10 Claims, 2 Drawing Figures

METHOD AND APPARATUS FOR DETECTING ULTRASONIC ENERGY

This invention relates to a method and apparatus for detecting the energy level of a beam of ultrasonic energy being propagated through a fluid.

Cleaning systems for use in manufacturing semiconductor devices effectively utilize ultrasonic energy which is propagated into standard chemical solutions by transducer crystals. The crystals may oscillate at an ultrasonic frequency in the range of between about 0.2 and 5 MHz, and thus such cleaning systems are labeled as "megasonic" cleaning systems. These systems effectively remove particles down to at least 0.3 micrometers in diameter from both sides of semiconductor wafers simultaneously, together with organic surface film, ionic impurities and many other contaminants. Megasonic cleaning is applied to silicon wafers at all processing stages, to ceramics, photomasks, and for photoresist removal, dewaxing and degreasing by using different solvents and stripping solutions. The outstanding advantages are major savings in chemicals, superior cleanliness, ability to clean both sides of a plurality of wafers simultaneously, and less handling.

One embodiment of a megasonic cleaning system is disclosed in detail in U.S. Pat No. 3,893,869, issued to A. Mayer et al. on July 8, 1975 and assigned to RCA Corporation. In order to provide the cleaning station described therein with a capability of cleaning batches of up to 100 or more silicon wafers or photomasks which can be as large as 6 inches square, a transducer assembly, such as described in my co-pending application, Ser. No. 800,276, filed concurrently herewith, is utilized. This transducer assembly comprises an array of eight hexagonal-shaped transducers mounted in two adjacent rows of four each. In operating such an array of transducers, it is necessary that the operator responsible for the proper maintenance thereof be able to rapidly determine whether every transducer and array is operating properly and at the desired energy level.

One way of detecting whether a megasonic transducer in a cleaning tank is operating properly at the desired energy level, is to place another transducer at the opposite end of the tank to receive the ultrasonic energy wave. This method is not practical if an array of several transducers is utilized. In order to receive the energy being propagated, an equal number of receiving transducers would be needed, or some method of switching the receiving transducers synchronously with the transmitting transducers. An oscilloscope or graphic display would also be necessary. Another method of detecting the energy is visual observation of the pressure wave as it is reflected from an angled reflecting plate placed at the opposite end of the tank. These reflections will break the surface of the cleaning fluid and can be seen if the angle is right, but since the fluid is generating bubbles, the reflections are not easily seen. The present invention provides a novel method and apparatus which uses no external power, and indicates not only the locations of ultrasonic energy beams but also their relative energy levels.

Figure 1:
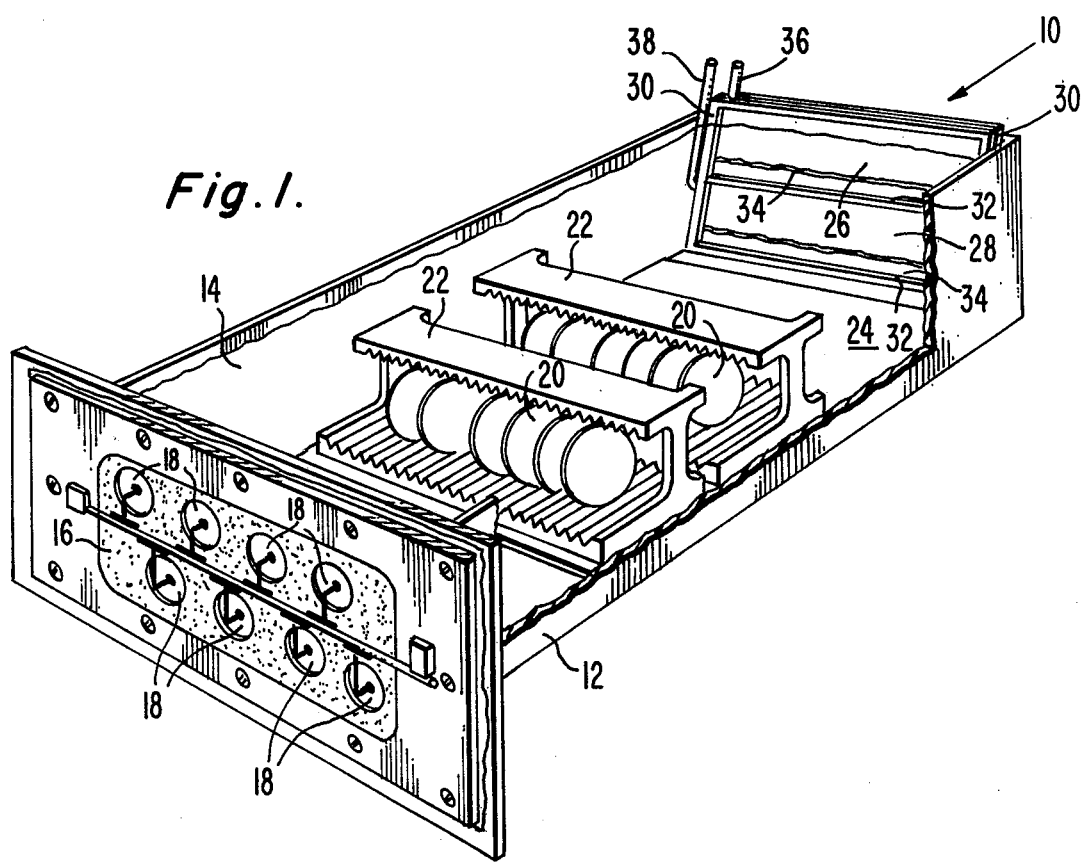
FIG. 1 is a partial, perspective view illustrating a megasonic cleaning tank with the present novel apparatus disposed at one end thereof.

Referring to FIG. 1 of the drawings, there is shown one embodiment of the novel energy-detecting apparatus 10 disposed at one end of a cleaning tank 12 adapted to hold a chemical cleaning fluid 14. At the other end of the tank 12 is a transducer assembly 16 comprising an array of eight transducers 18 mounted in two adjacent rows of four each. The transducers 18 are adapted to oscillate at an ultrasonic frequency, in the range of between about 0.2 and 5 MHz, for propagating beams of ultrasonic energy into the fluid 14. The construction of such a transducer assembly 16 is disclosed in detail in my co-pending application, Ser. No. 800,276, filed concurrently herewith. A plurality of silicon wafers 20 whose surfaces are to be cleaned are disposed parallel to each other in typical wafer holders 22 which rest on a platform 24 within the tank 12. Such a tank 12 may comprise a portion of a megasonic cleaning system as described in greater detail in the aforementioned U.S. Pat. No. 3,893,869.

Figure 2:
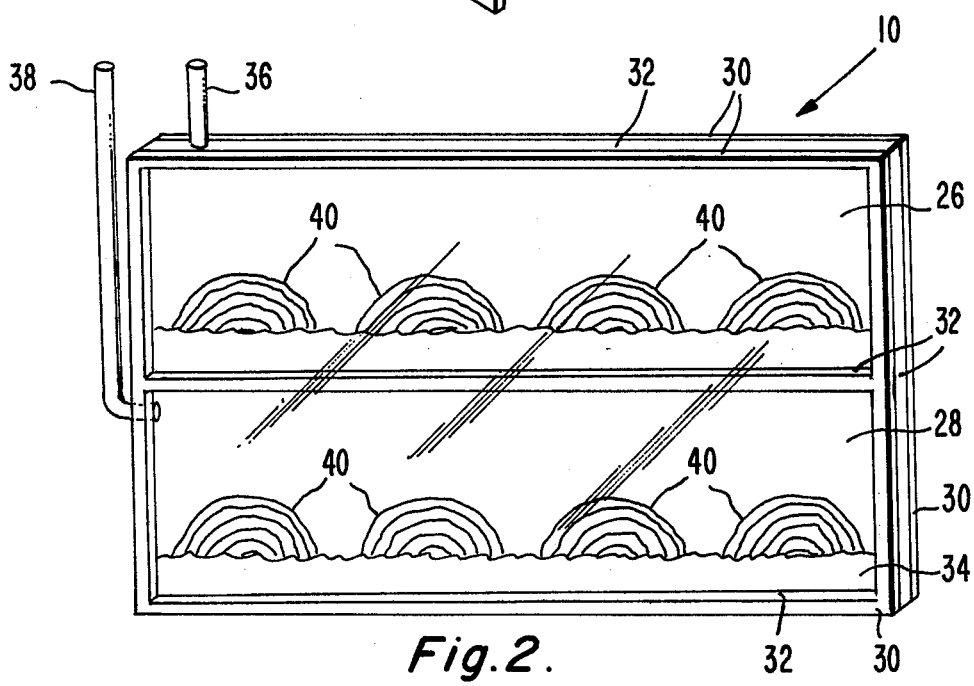
FIG. 2 is a perspective view of the present novel apparatus illustrating its operation.

Referring to FIG. 2, the preferred embodiment of the apparatus 10 for detecting ultrasonic energy comprises an upper chamber 26 disposed above a lower chamber 28. The present embodiment has two separate chambers 26 and 28 in order to accommodate both the upper and lower rows of transducers 18, as further explained below; one chamber would be sufficient if only one row of transducers 18 is utilized. Both chambers 26 and 28 have two sides separated by a spacing no greater than about 25 millimeters. Preferably, the two sides are separated by a spacing of approximately 5 millimeters. In the present embodiment, the two sides of the upper chamber 26 and the two sides of the lower chamber 28 comprise two parallel plates 30 of clear quartz which form sides common to both chambers 26 and 28, as illustrated in FIG. 2. The plates 30 of quartz are rectangular and are separated by spacers 32 sealed thereto to form the separate chambers 26 and 28. The spacers 32 may be made of quartz which is fused to the plates 30 by conventional heat treatment, or they may be plastic spacers which are glued between the plates to form the separate chambers 26 and 28, which are then sealed with a surrounding bead of silicone rubber. Whatever sealing process is used, it must be leak proof, since both chambers 26 and 28 are partially filled with a liquid 34. Although the present example illustrates the two chambers 26 and 28 as being integrally attached to each other due to their sharing common sides, the chambers 26 and 28 could also be two completely separate chambers held within a frame.

Both chambers 26 and 28 have a transparent section which allows for visual observation of the height of the liquid 34 therein. In the present embodiment, the liquid 34 is able to be viewed by utilizing plates 30 of clear quartz for the sides of the chambers 26 and 28. The sides or portions thereof may be made of any other transparent material allowing for visual observation of the liquid height, such as clear plastic. However, quartz is found to work best since the beams of ultrasonic energy are partially absorbed by plastic plates and become attenuated, which is undesirable for the present energy-detecting apparatus 10. In addition, quartz plates contain relatively few impurities, and thus minimize the amount of possible contamination in the cleaning fluid 14.

Both chambers 26 and 28 are partially filled with the liquid 34 which is utilized to indicate the energy level of the beams of ultrasonic energy. The chambers 26 and 28 may be filled respectively through narrow filling tubes 36 and 38 connected thereto, as illustrated in FIG. 2. In order to enhance the visual observation of the liquid 34, it is preferred that the liquid 34 be colored and have a viscosity lower than water. Both freon and methanol work well and may be colored red by using a soluble red dye.

The novel method of utilizing the apparatus 10 for detecting the energy level of the beams of ultrasonic energy propagated from the transducer assembly 16 through the cleaning fluid 14 comprises partially filling both chambers 26 and 28 with the colored liquid 34 so that they are about half full. The exact level of the liquid 34 in each of the chambers 26 and 28 is adjusted so that when the apparatus 10 is positioned at the end of the cleaning tank 12, as illustrated in FIG. 1, the beams of energy propagated by the upper row of transducers 18 strike the surface of the liquid 34 in the upper chamber 26, and the beams propagated by the lower row strike the surface of the liquid 34 in the lower chamber 28. In the present embodiment, the height of the liquid in each of the chambers 26 and 28 is about 25 millimeters. The energy-detecting apparatus 10 may also serve as a reflecting plate disposed at the end of the tank 12; the sides of the chambers 26 and 28 are typically positioned at an angle of the order of 60° with the surface of the cleaning fluid 14. A reflecting plate is utilized for reflecting the energy waves, propagated by the energy transducer assembly 16, back towards the surface of the fluid 14, so that the reflected beams clear the tank 12 and do not interfere with the ongoing cleaning action of subsequent energy waves.

In operation, the beams of energy (or energy waves) propagated by the transducers 18 through the cleaning fluid 14 strike the liquid 34 at the surface thereof, i.e., at the liquid/air interface in the present embodiment. These beams of energy generate, at the surface of the liquid 34, a series of arc-shaped sprays 40, as illustrated in FIG. 2. Each of the arc-shaped sprays 40 has an amplitude proportional to the energy level of the ultrasonic beam striking that particular location. In the present embodiment, the arc-shaped sprays 40 have an amplitude of about 2 to 3 centimeters in height above the surface of the liquid 34. Consequently, an operator may tell at a glance what the relative amplitudes of the sprays 40 are, and determine whether or not every transducer 18 in the assembly 16 is operating properly.

In order to insure that such an energy-detecting apparatus 10 is sensitive to the energy levels of the beams, it is important that the spacing between the quartz plates 30, and the viscosity of the liquid 34, be chosen so that visible arc-shaped sprays 40 are generated by the beams of ultrasonic energy. Therefore, it is critical that the spacing between the quartz plates 30 be no greater than about 25 millimeters, since the beams of ultrasonic energy become unable to generate visible arc-shaped sprays 40 as the surface area of the liquid 34 increases. In addition, as the viscosity of the liquid 34 increases, more energy is required to generate the visible arc-shaped sprays 40, making the apparatus 10 less sensitive to variations in beam energy levels. I have found that a liquid having a viscosity lower than water, such as freon or methanol, is much more effective for detecting megasonic energy than a liquid having a viscosity as high as water.

The novel method and the apparatus 10 provide relatively simple means for detecting the energy level of a beam of ultrasonic energy being propagated through a cleaning fluid 14. The apparatus 10 can remain in the cleaning tank 12 permanently, uses no external power, and indicates not only the locations of ultrasonic energy beams but also their relative energy levels. By taking a glance at the colored arc-shaped sprays 40, an operator may quickly determine whether or not all of the transducers 18 are operating properly. Such information is most useful to a technician responsible for the maintenance of megasonic cleaning equipment.

What is claimed is:

1. An apparatus for detecting the energy level of a beam of ultrasonic energy being propagated through a fluid adjacent thereto, comprising a chamber having two sides separated by a spacing no greater than about 25 millimeters, the width and height of said sides being significantly greater than said spacing, said chamber being partially filled with a liquid and having a transparent section allowing for visual observation of the height of said liquid therein, the liquid having a viscosity lower than water and being disposed within said chamber so that the free surface of the liquid intersects said two sides.

2. An apparatus as defined in claim 1 wherein said two sides are parallel plates of quartz separated by spacers sealed thereto to form a plurality of chambers.

3. An apparatus as defined in claim 2 wherein said two plates are separated by a spacing of approximately 5 millimeters.

4. An apparatus as defined in claim 3 wherein said two plates are rectangular and are glued together with spacers made of plastic to form two separate chambers, one above the other.

5. An apparatus ad defined in claim 1 wherein said liquid is colored.

6. An apparatus as defined in claim 5 wherein said liquid is freon.

7. A method of detecting the energy level of a beam of ultrasonic energy being propagated through a fluid comprising:

filling a chamber partially with a liquid, said chamber having two sides separated by a spacing no greater than about 25 millimeters and having a transparent section allowing for visual observation of the height of said liquid therein, the liquid having a viscosity lower than water and being disposed within said chamber so that the free surface of the liquid intersects said two sides, the sides having a width and height significantly greater than said spacing, and positioning said chamber in said fluid so that said beam of energy strikes said liquid at the surface thereof from a direction substantially parallel to the plane of said free surface, whereby said beam generates a visible arc-shaped spray having an amplitude proportional to the energy level of said beam.

8. A method as recited in claim 7 wherein said chamber is half-filled with a colored liquid.

9. A method as recited in claim 8 wherein said liquid is freon.

10. A method as recited in claim 7 wherein said two sides are parallel plates of quartz separated by quartz spacers fused thereto to form two separate chambers, one above the other, and positioned at an angle of about 60° with the surface of a chemical cleaning fluid disposed in a tank adapted for megasonic cleaning.

* * * * *